US009483850B2

United States Patent
Niu et al.

(10) Patent No.: US 9,483,850 B2
(45) Date of Patent: Nov. 1, 2016

(54) CYLINDER SOURCE SOFTWARE-POSITIONING METHOD FOR PET CALIBRATION AND IMAGE QUALITY ASSURANCE

(71) Applicant: TOSHIBA MEDICAL SYSTEMS CORPORATION, Otawara-shi (JP)

(72) Inventors: Xiaofeng Niu, Mundelein, IL (US); Hongwei Ye, Kenosha, WI (US); Wenli Wang, Briarcliff Manor, NY (US)

(73) Assignee: TOSHIBA MEDICAL SYSTEMS CORPORATION, Otawara-shi (JP)

( * ) Notice: Subject to any disclaimer, the term of this patent is extended or adjusted under 35 U.S.C. 154(b) by 163 days.

(21) Appl. No.: 14/084,304

(22) Filed: Nov. 19, 2013

(65) Prior Publication Data

US 2015/0139513 A1  May 21, 2015

(51) Int. Cl.
G06K 9/00 (2006.01)
G06T 11/00 (2006.01)
G06T 7/60 (2006.01)

(52) U.S. Cl.
CPC ............. G06T 11/005 (2013.01); G06T 7/606 (2013.01); G06T 2207/10104 (2013.01); G06T 2207/30172 (2013.01)

(58) Field of Classification Search
None
See application file for complete search history.

(56) References Cited

U.S. PATENT DOCUMENTS

| | | |
|---|---|---|
| 6,774,358 B2 | 8/2004 | Hamill et al. |
| 6,963,065 B2 | 11/2005 | Conti et al. |
| 7,679,049 B2 * | 3/2010 | Rietzel .................... G01T 1/169 250/252.1 |
| 7,718,954 B2 | 5/2010 | Wang et al. |
| 8,193,505 B2 | 6/2012 | Watson et al. |
| 8,965,082 B2 * | 2/2015 | Wang .................... G06T 7/0026 382/128 |
| 2007/0176087 A1 * | 8/2007 | Wang .................... G01T 1/1648 250/252.1 |
| 2010/0072375 A1 * | 3/2010 | Panin .................... G01T 1/1648 250/362 |
| 2015/0139513 A1 * | 5/2015 | Niu ........................ G06T 11/005 382/131 |
| 2015/0142389 A1 * | 5/2015 | Niu ........................ G01T 1/1647 702/189 |

OTHER PUBLICATIONS

R. D. Badawi, et al. "Algorithms for Calculating Detector Efficiency Normalization Coefficients for True Coincidences in 3D PET"; Phys. Med. Biol. 43, (1998); pp. 189-205.
John M. Ollinger, "Detector Efficiency and Compton Scatter in Fully 3D PET"; IEEE Transactions on Nuclear Science, vol. 42, No. 4, Aug. 1995; pp. 1168-1173.
Wenli Wang, et al. "A New Component Approach to Efficiency Normalization for 3D PET"; IEEE Transactions on Nuclear Science, vol. 54, No. 1, Feb. 2007; pp. 92-99.

* cited by examiner

*Primary Examiner* — Nancy Bitar
(74) *Attorney, Agent, or Firm* — Oblon, McClelland, Maier & Neustadt, L.L.P.

(57) ABSTRACT

A method and system for determining a position of a source including obtaining prompt data and related delayed data from a Positron Emission Tomography (PET) scanner, generating a sinogram from the prompt data, generating crystal efficiency correction factors by performing a normalization calibration based on the obtained delayed data, performing normalization correction on the generated sinogram based on the crystal efficiency correction factors to generate a corrected sinogram, rebinning the corrected sinogram to generate a plurality of two-dimensional sinogram slices, and determining a central axis for each of the plurality of two-dimensional sinogram slices using a center estimation process.

17 Claims, 15 Drawing Sheets

Phantom 1

Phantom 2

Phantom 3

Phantom 1

Phantom 2

Phantom 3

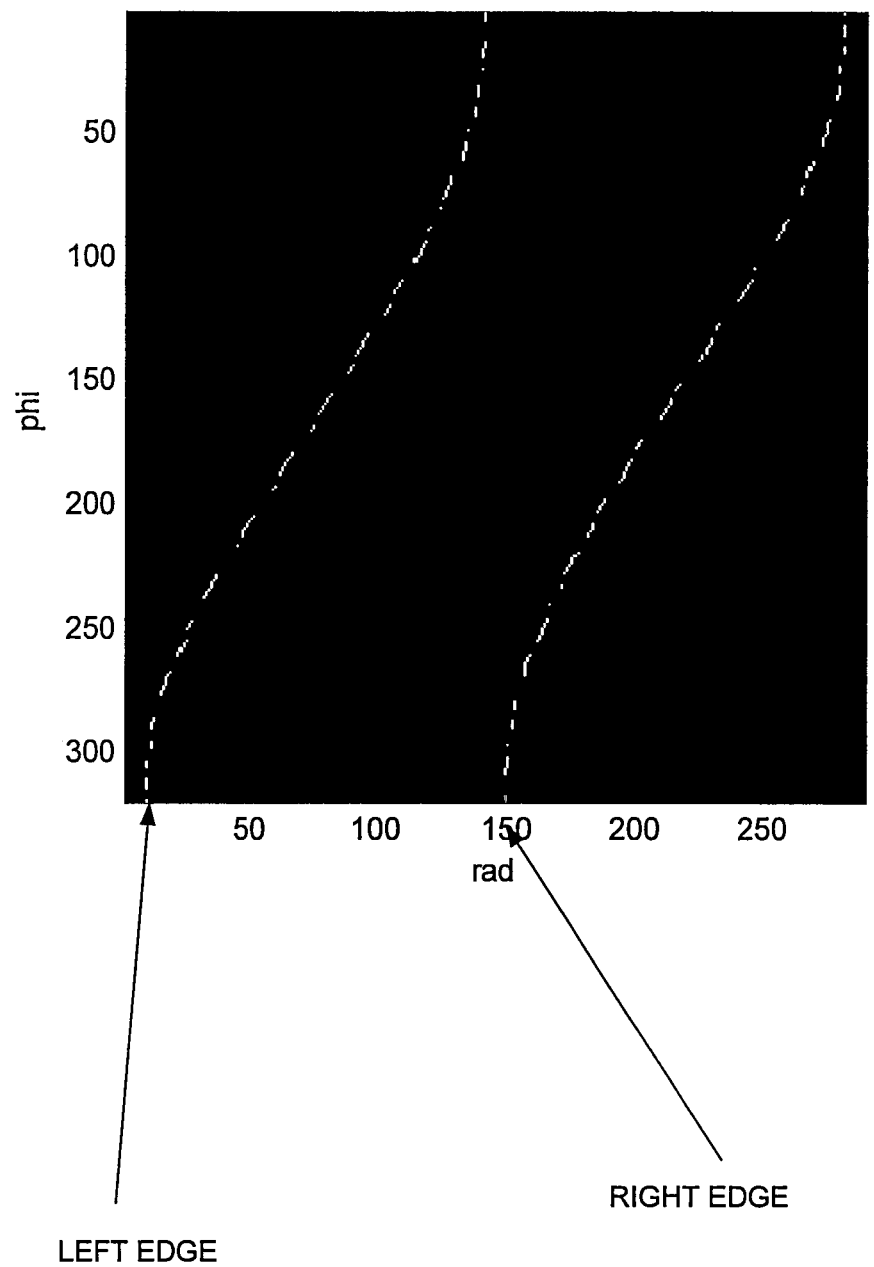

CYLINDER SOURCE SOFTWARE-POSITIONING METHOD FOR PET CALIBRATION AND IMAGE QUALITY ASSURANCE

FIELD

The present disclosure generally relates to an apparatus and method for performing Positron Emission Tomography (PET) calibration and image quality assurance by estimating a spatial position of a cylinder source.

RELATED CASES

The present application is related to and incorporates by reference "Method and system of random-event-based count-rate adaptive normalization for PET detector efficiency", U.S. patent application Ser. No. 14/084,363.

BACKGROUND

The quality of PET images has improved in recent years with the introduction of new technologies that improve PET calibration and assure high image quality. Cylinder sources are widely used in PET calibration and image quality assurance procedures. For instance, some procedures are positioning sensitive with respect to crystal efficiency calibration and image quality at different positions of the scanner's field of view (FOV). One approach to address these issues is to determine the position of the cylinder source at a specific location in the FOV. Techniques to determine the position are external mechanical instruments such as lasers or by using imaging technologies such as CT or PET reconstruction to determine the position.

However, using external instruments have additional cost and require additional calibration procedures. Using a CT image may result in the misalignment between the PET scanner and the CT scanner, which affects the positioning accuracy. Finally, using a PET reconstructed image has a number of issued associated therewith. For example, the reconstructed image suffers from reconstruction artifacts if the system is not fully or properly calibrated. Examples include ring artifacts that occur if the intrinsic crystal efficiency and block profile effect correction is not applied. For the ease of notation, the term "crystal efficiency" corresponds to "intrinsic crystal efficiency and block profile effect" in the following disclosure. Another issue is that the PET reconstruction process is an iterative process that is time consuming and involves computational expensive physical corrections such as scatter estimation.

BRIEF DESCRIPTION OF THE DRAWINGS

A more complete appreciation of the embodiments described herein, and many of the attendant advantages thereof will be readily obtained as the same becomes better understood by reference to the following detailed description when considered in connection with the accompanying drawings, wherein:

FIGS. 5A, 5B and 5C illustrate examples of left and right edge detection for the three exemplary phantoms;

DETAILED DESCRIPTION

Figure 1A:
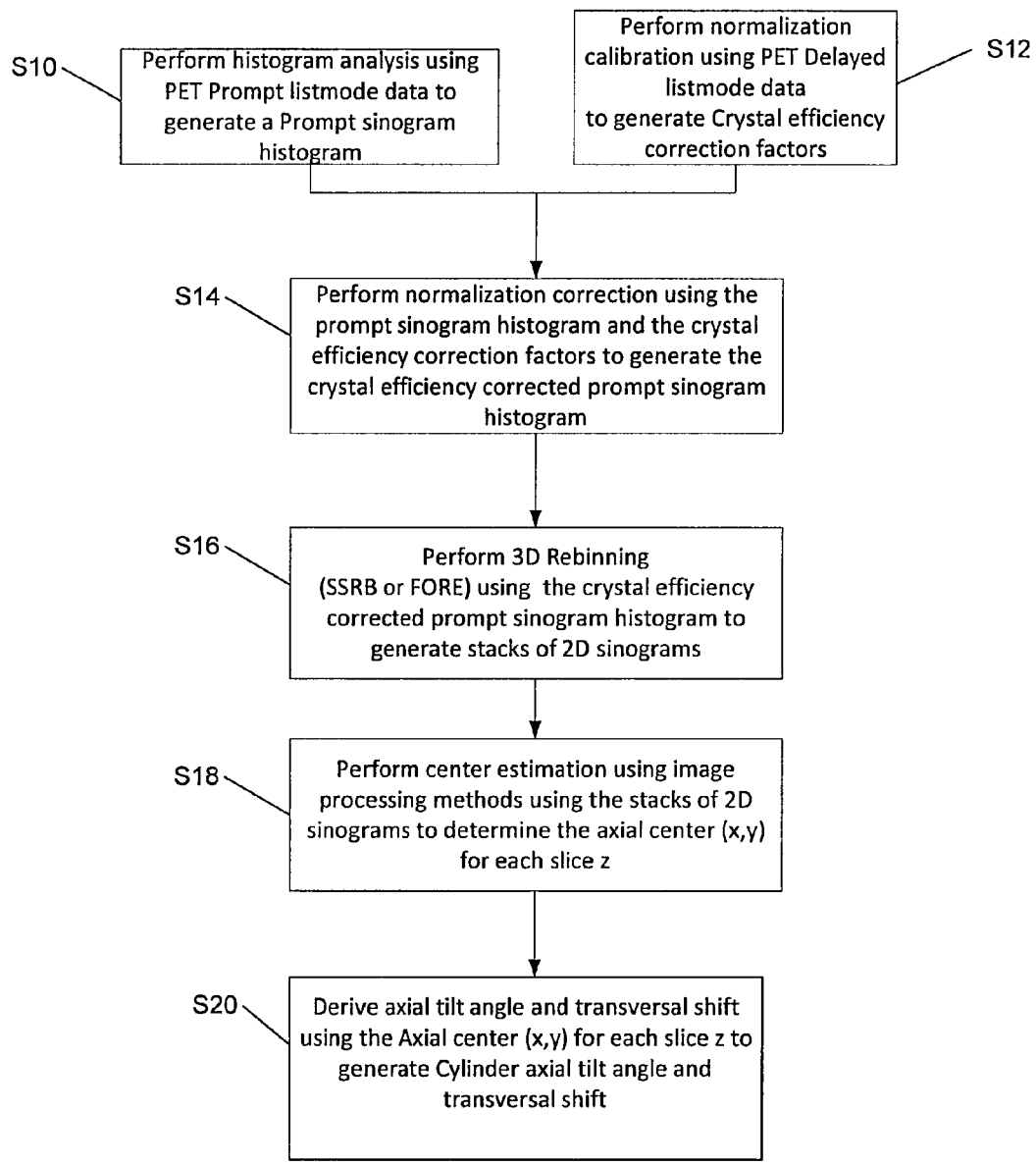
FIGS. 1A and 1B illustrate a process for determining the positioning of a cylinder source.

The present disclosure describes an apparatus and method for calibrating an imaging system.

Embodiments disclosed herein provide for a method of estimating a spatial position of a cylinder source. The method includes the steps of obtaining prompt data and related delayed data from a Positron Emission Tomography (PET) scanner, generating a sinogram from the prompt data, generating crystal efficiency correction factors by performing a normalization calibration based on the obtained delayed data, performing normalization correction on the generated sinogram based on the crystal efficiency correction factors to generate a corrected sinogram, rebinning the corrected sinogram to generate a plurality of two-dimensional sinogram slices, and determining a central axis for each of the plurality of two-dimensional sinogram slices using a center estimation process.

According to another embodiment, there is further included in the method the step of deriving an axial tilt angle and a transversal shift for each of the plurality of two-dimensional sinogram slices based on the respective determined central axis.

According to another embodiment, the step of determining the central axis for each of the plurality of two-dimensional sinogram slices further includes performing a thresholding process on each of the plurality of two-dimensional sinogram slices to convert the respective slice to a binary image to generate a plurality of binary images, performing morphology operations on the respective binary image to generate processed binary images, detecting left and right edges in the respective processed binary images, excluding edge outliers, within the plurality of processed binary images, that correspond to crystals at transversal edges of each module, determining a mean curve of the left and right edges, and applying sinusoidal function curve fitting to the mean curve of the left and right edges in order to determine the central axis within the sinogram.

According to another embodiment, the source is a cylinder.

According to another embodiment, the source is an ellipse.

According to another embodiment, the thresholding processing is one of a histogram-shape-based process in which characteristic elements of a smoothed histogram are used to obtain a binary image, a clustering-based process in which gray-level samples are clustered in background and foreground regions or are modeled as a mixture of Gaussians, an entropy process, which implements algorithms that use entropy of foreground and background regions or use cross-entropy between an original and a binarized image, an object-attribute-based process, which searches for similarities between gray-level and binarized images, where the similarities include fuzzy shape similarity and edge coincidence, a spatial process, which utilizes a higher-order probability distribution taking into account a correlation between pixels, and a local process, which applies a threshold value to each pixel based on local image characteristics.

According to another embodiment, the thresholding processing is a histogram-shape-based process, and the histogram-shape-based process includes generating a histogram having two peaks representing background and object regions, and determining a minimum between the two peaks.

According to another embodiment, the morphology operations include at least one of dilation and erosion.

According to another embodiment, the excluding step further includes excluding lines of response with crystals at transversal edges of each module, from the detected edges.

Embodiments disclosed herein provide a device for calibrating an imaging system. The device includes processing circuitry configured to obtain prompt data and related delayed data from a Positron Emission Tomography (PET) scanner, generate a sinogram from the prompt data, the generating utilizing histogram analysis, generate crystal efficiency correction factors by performing a normalization calibration based on the obtained delayed data, perform normalization correction on the generated sinogram based on the crystal efficiency correction factors to generate a corrected sinogram, rebin the corrected sinogram to generate a plurality of two-dimensional sinogram slices, and determine a central axis for each of the plurality of two-dimensional sinogram slices using a center estimation process.

According to another embodiment, the processing circuitry is further configured to derive an axial tilt angle and a transversal shift for each of the plurality of two-dimensional sinogram slices based on the respective determined central axis.

According to another embodiment, the processing circuit is further configured to determine the central axis for each of the plurality of two-dimensional sinogram slices further comprises by being configured to perform a thresholding process on each of the plurality of two-dimensional sinogram slices to convert the respective slice to a binary image to generate a plurality of binary images, perform morphology operations on the respective binary image to generate processed binary images, detect left and right edges in the respective processed binary images, exclude edge outliers, within the plurality of processed binary images, that correspond to crystals at transversal edges of each module, determine a mean curve of the left and right edges, and apply sinusoidal function curve fitting to the mean curve of the left and right edges in order to determine the central axis within the sinogram.

According to another embodiment, the source is a cylinder.

According to another embodiment e, the source is an ellipse.

According to another embodiment, the thresholding processing is one of a histogram-shape-based process in which characteristic elements of a smoothed histogram are used to obtain a binary image, a clustering-based process in which gray-level samples are clustered in background and foreground regions or are modeled as a mixture of Gaussians, an entropy process, which implements algorithms that use entropy of foreground and background regions or use cross-entropy between an original and a binarized image, an object-attribute-based process, which searches for similarities between gray-level and binarized images, where the similarities include fuzzy shape similarity and edge coincidence, a spatial process, which utilizes a higher-order probability distribution taking into account a correlation between pixels, and a local process, which applies a threshold value to each pixel based on local image characteristics.

According to another embodiment, the thresholding processing is a histogram-shape-based process, and the histogram-shape-based process includes generating a histogram having two peaks representing background and object regions, and determining a minimum between the two peaks.

According to another embodiment, the morphology operations include at least one of dilation and erosion.

According to another embodiment, the processing circuitry is further configured to exclude edge outliers by being configured to exclude lines of response with crystals at transversal edges of each module, from the detected edges.

The present embodiments provide a technique for estimating the spatial position of a source, such as a cylinder, from a sinogram domain. In particular, a sinogram is a visual representation of raw data. The technique includes a count-rate adaptive crystal efficiency normalization calibration method using PET delayed window list-mode data. Further, the cylinder's transversal center is estimated from the average curve of left edge and right edge of the sinogram, followed by sinusoidal curve fitting. Moreover, outlier exclusion criteria are implemented using data from a module-based PET scanner. The outlier exclusion criteria enable elimination of outliers at the edge of modules.

Figure 1B:
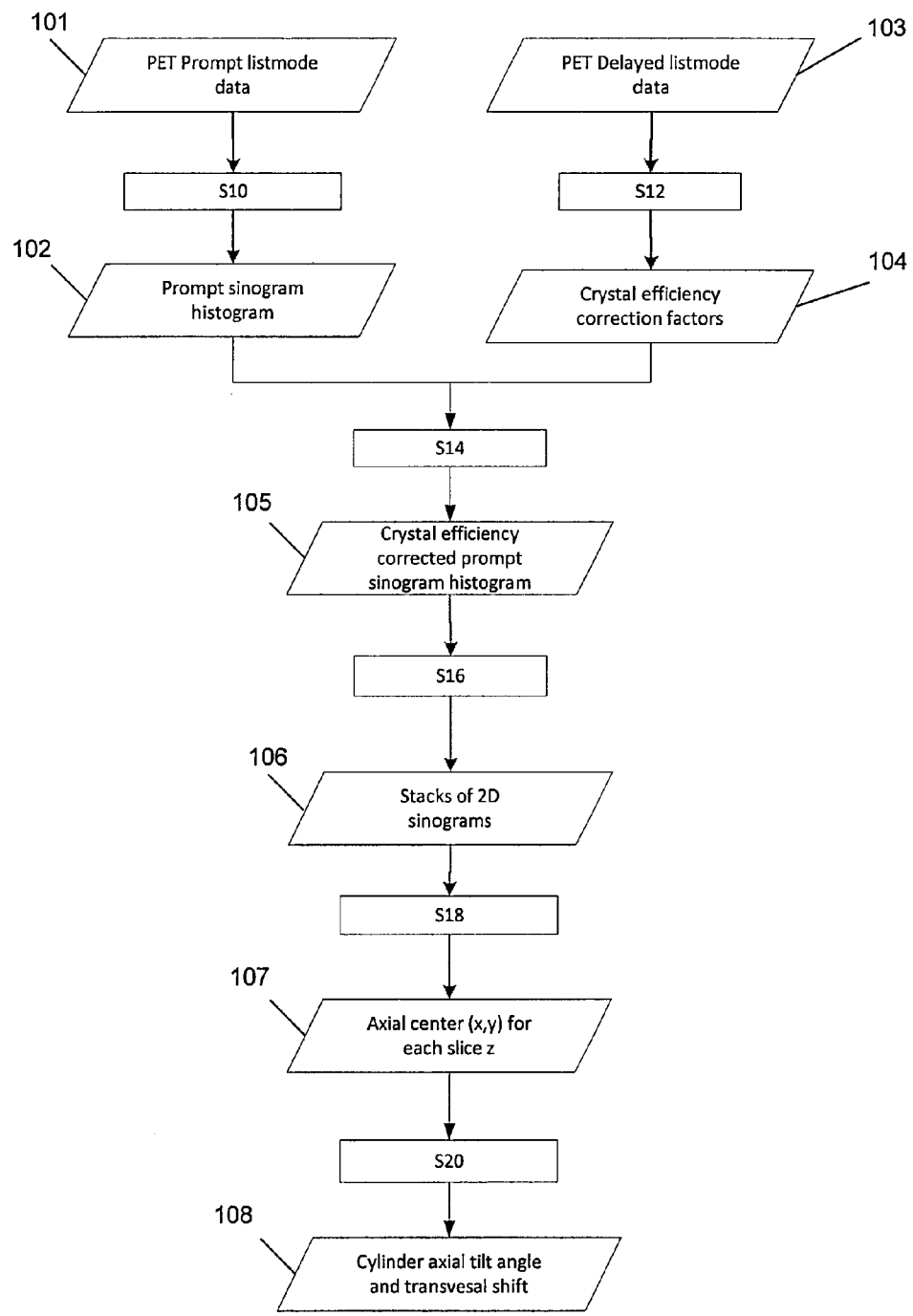

FIGS. 1A and 1B illustrate an embodiment by which the spatial position of the cylinder source is estimated.

In step S10, a histogram of the PET "prompt paired list-mode" data 101 is performed and this data is used to generate a sinogram, which is identified as a prompt sinogram or histogram 102. The PET "prompt paired list-mode" data 101 represents all the true events, the scattered events, and the random events collected by the PET which have satisfied the coincidence time window criterion.

In step S12, a normalization calibration process is performed using PET "delayed list-mode" data 103. The PET "delayed list-mode data" is data representing delayed window-paired events (random events only). Random events do not include effects from the scanner geometry and the phantom geometry, or attenuation from the phantom. By using paired random events, crystal efficiency factors can be obtained that are unrelated to the line-of-response (LOR) location. This also ensures less noisy estimations for crystals at the axial edges of the scanner. Since the "delayed list-mode" data used for normalization correction and the "prompt list-mode" data are from the same patient/phantom, any effect from unmatched system count rate is minimized. The result of this process is the generation of intrinsic crystal efficiency correction (Ne) and block profile effect factors (Nb) 104.

In step S14, the crystal efficiency normalization correction is applied to the PET prompt sinogram to generate a crystal efficiency corrected prompt sinogram or histogram 105. The crystal efficiency normalization correction is applied to the PET prompt sinogram based on the crystal efficiency correction factors 104 determined in step S12. Each individual line-of-response (LOR) corrected based on the corresponding crystal efficiency of the crystals forming the LOR. Each crystal's efficiency is modeled as the multiplication of its intrinsic crystal efficiency and its block profile effect. The resulting sinogram 105 is a 3D type sinogram.

In step S16, the 3D sinogram 105 is converted into stacks of 2D sinograms 106 using a 3D rebinning method such as single slice rebinning (SSRB) or Fourier rebinning algorithm (FORE). Michel Defrise, et. al. "Exact and approximate rebinning algorithms for 3-D PET data" IEEE Transaction on medical imaging, Vol. 16, No. 2, April 1997, herein incorporated by reference, provides further detail regarding the rebinning methods. The edge slices at both ends of the axial FOV are excluded due to the limited count statistics.

In step S18, the stacks of 2D sinograms 105 are used to estimate the transversal center position (x,y) of the cylinder. Specifically this step finds the central axis position of the cylinder for each different slice, for instance, as z positions. This estimation is performed for each slice z using a multi-step image processing method further described with reference to FIG. 2, and generates an axial center (x,y) for each slice z 107.

In step S20, the axial tilt angle and the transversal shift 108 is derived for each z slice. For instance, with the estimated (x1,y1) at z1 and (x2,y2) at z2, the axial tilt angles are $\Theta x = \arctan[(x2-x1)/(z2-z1)]$ and $\Theta y = \arctan[(y2-y1)/(z2-z1)]$.

Figure 2:
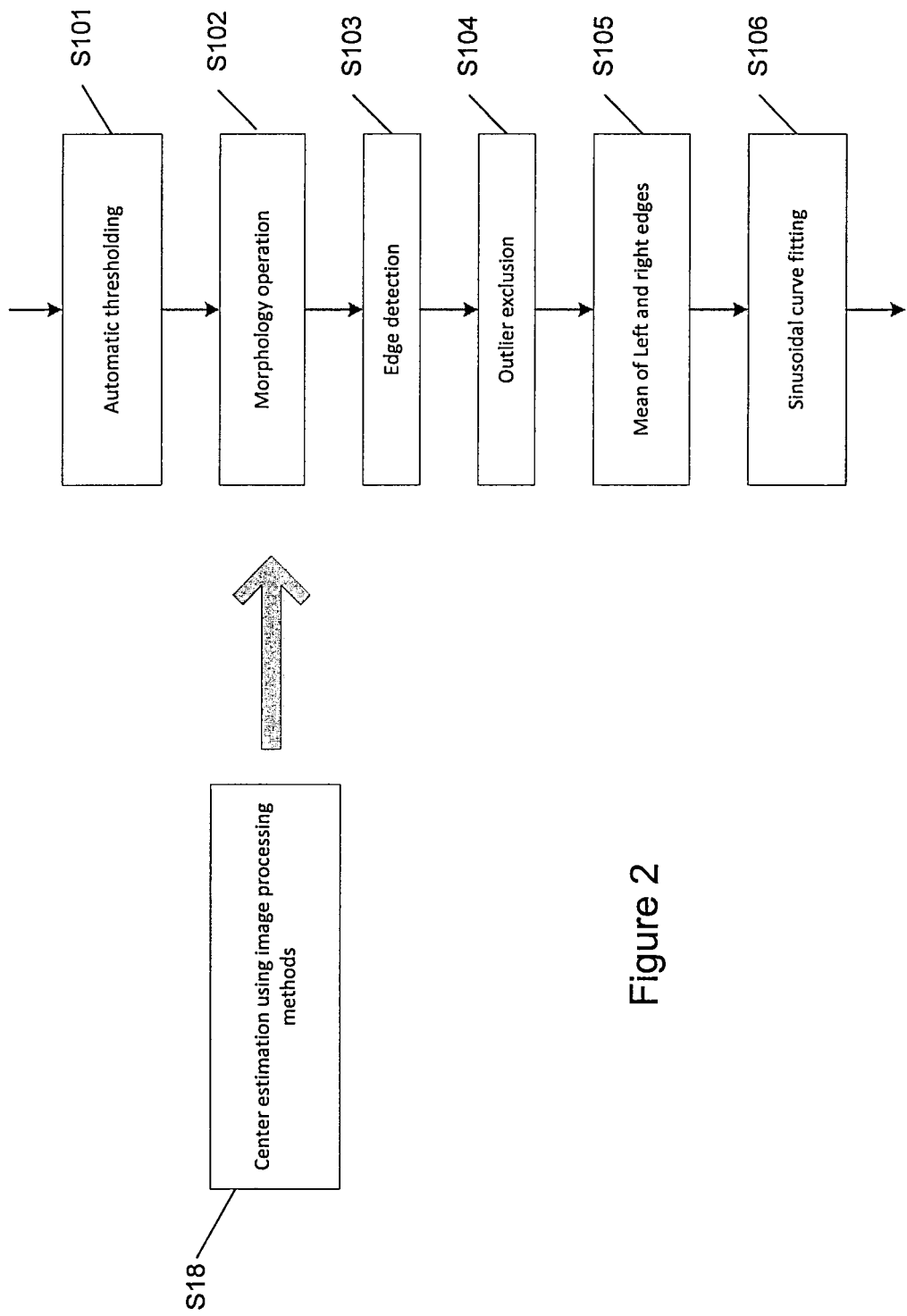
FIG. 2 illustrates a detailed process for estimating the center of the cylinder using image processing techniques.

FIG. 2 illustrates a process for estimating the transversal center position (x,y) of the cylinder step shown as step S18 of FIG. 1.

In step S101, an automatic thresholding process is performed to covert the sinogram image into a binary image. There are a number of different ways to threshold a sinogram image. For example, a histogram-shape-based method can be used in which characteristic elements of a smoothed histogram are used to obtain a binary image. A clustering-based method may also be used in which gray-level samples are clustered in background and foreground regions, or are modeled as a mixture of Gaussians. An entropy method can also be used, which implements algorithms that use the entropy of the foreground and background regions or use the cross-entropy between an original and a binarized image. An object-attribute-based method can also be used, which searches for similarities between gray-level and binarized images, where the similarities include fuzzy shape similarity, edge coincidence, or other similar methods. It is also possible to use a spatial method that utilizes a higher-order probability distribution taking into account the correlation between pixels, and to use a local method that applies a threshold value to each pixel based on local image characteristics. A histogram-shape-based method can be used with sufficient accuracy after the operation of normalization correction in S14. The resulting histogram will have two peaks representing the background and object regions. By finding the minimum between the two peaks, the thresholding procedure can be done automatically.

In step S102, one or more morphology operations are applied to remove isolated edge pixels and to pad holes in the data. Examples of the morphology operations are dilation and erosion. The fundamental function of binary morphology is to probe an image with a simple, pre-defined shape, thereby determining whether the pre-defined shape fits or misses the shapes within the binary image. Dilation is a morphology technique in image processing that probes and expands shapes contained in the input image. Dilation is a shift-invariant (translation invariant) operation and gradually enlarges the boundaries of regions within the image. Erosion is also translation invariant and erodes away the boundaries of regions within the image.

In step S103, edge detection is performed on the image that has been processed in step S102. The edge detection detects the edges of the image.

In step S104, the images for which detection has been performed are gathered and outliers are excluded. Specifically, for module-based PET scanners, LORs with crystals at the transversal edges of each module are excluded from the detected edges. For instance, after 3D rebinning in step S16, each slice has the same LOR distribution.

In step S105, the mean curve of the left and right edges is calculated and the determined mean curve is designated to represent the center of the cylinder in the sinogram domain.

Table 1 illustrates the estimated center (x,y) for different slices. Axial span, or average over z direction can be used to reduce the statistical error.

|  | Phantom 1 | Phantom 2 | Phantom 3 |
| --- | --- | --- | --- |
| True Position (mm) | [0, 0] | [140, 0] | n/a |
| Slice #1 estimation (mm) | [−0.08, 0.002] | [140.02, 0.25] | [5.91, −127.14] |
| Slice #2 estimation (mm) | [0.00, 0.00] | [139.78, 0.04] | [6.29, −126.75] |
| Slice #3 estimation (mm) | [0.00, 0.00] | [140.02, 0.04] | [6.29, −126.74] |
| . . . | | | |

In step S106, sinusoidal function curve fitting is performed. In this step, a mathematical function is constructed that best fits the data points generated in step S105. This step is provided to estimate the center of the cylinder at a specific slice, which may be a circle or ellipse, for example.

Figures 3A, 3B:
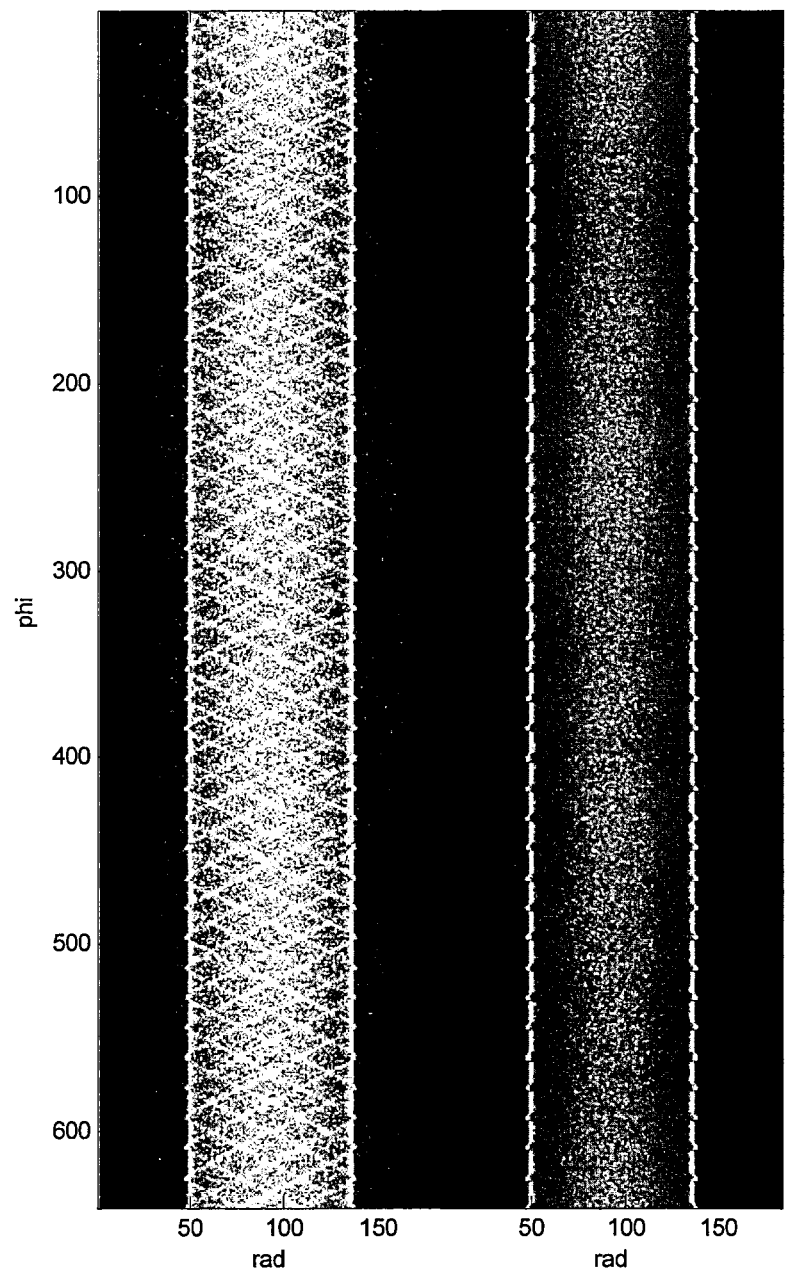
FIGS. 3A, 3B, 3C, 3D, 3E and 3F illustrate before and after examples of three phantoms subject to normalization correction.
Figures 3C, 3D:
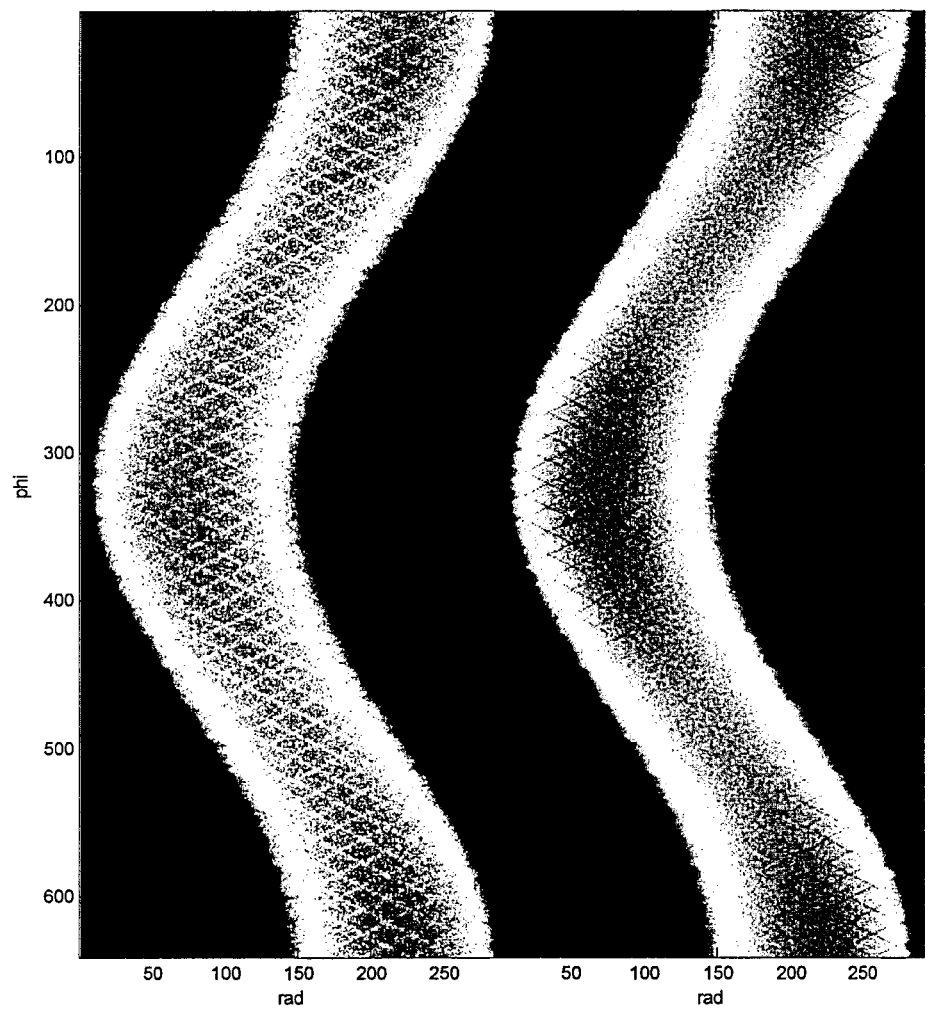
Figures 3E, 3F:
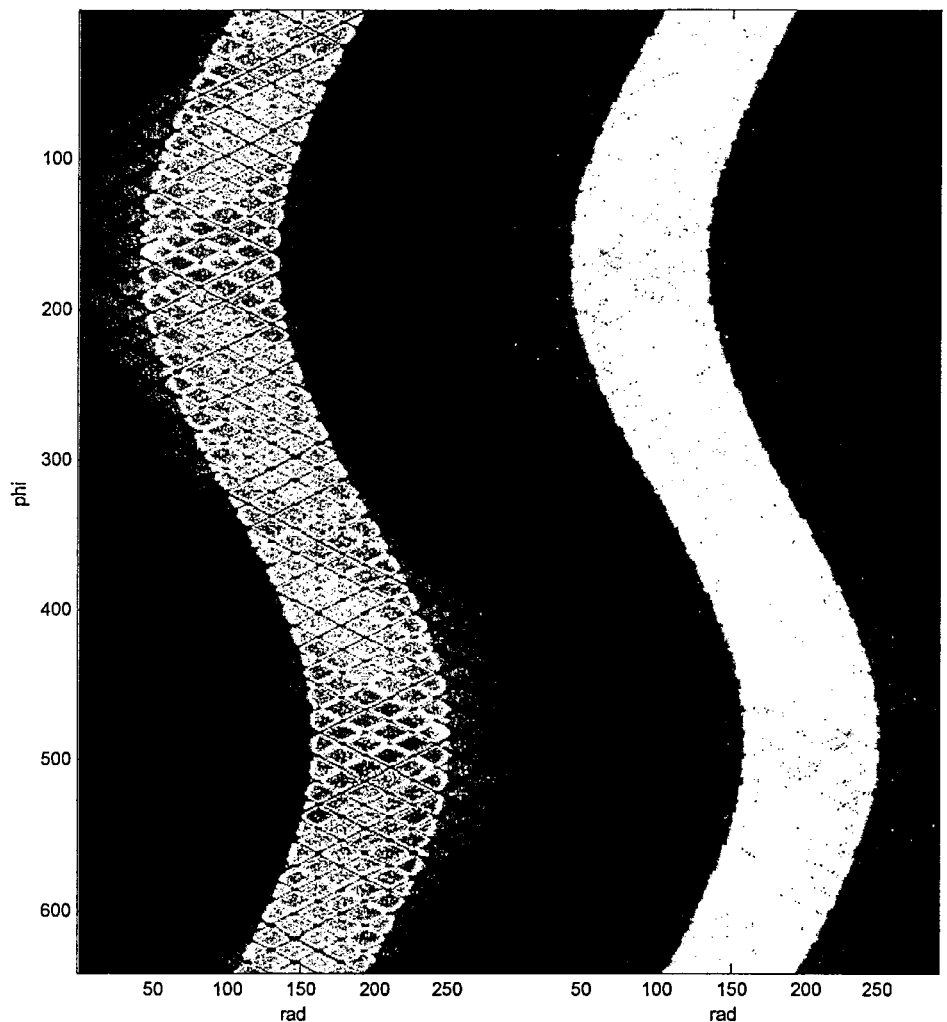

FIGS. 3A, 3B, 3C, 3D, 3E, and 3F illustrate exemplary sinograms before and after the normalization correction step S14 is performed. FIGS. 3A, 3C and 3E illustrate "before" versions of the sinograms, while FIGS. 3B, 3D and 3F, illustrate "after" versions of the sinograms.

FIGS. 3A and 3B illustrate a single slice of a sinogram of a first phantom in which the cylinder is centered. FIGS. 3C and 3D illustrate a single slice of a sinogram of a second phantom in which the cylinder is off-centered. FIGS. 3E and 3F illustrate a single slice of a sinogram of a third phantom in which the cylinder is also off-centered. Each of FIGS. 3B, 3D, and 3F illustrate how the sinogram appears after crystal efficiency normalization correction is applied to the image.

Figure 4A:
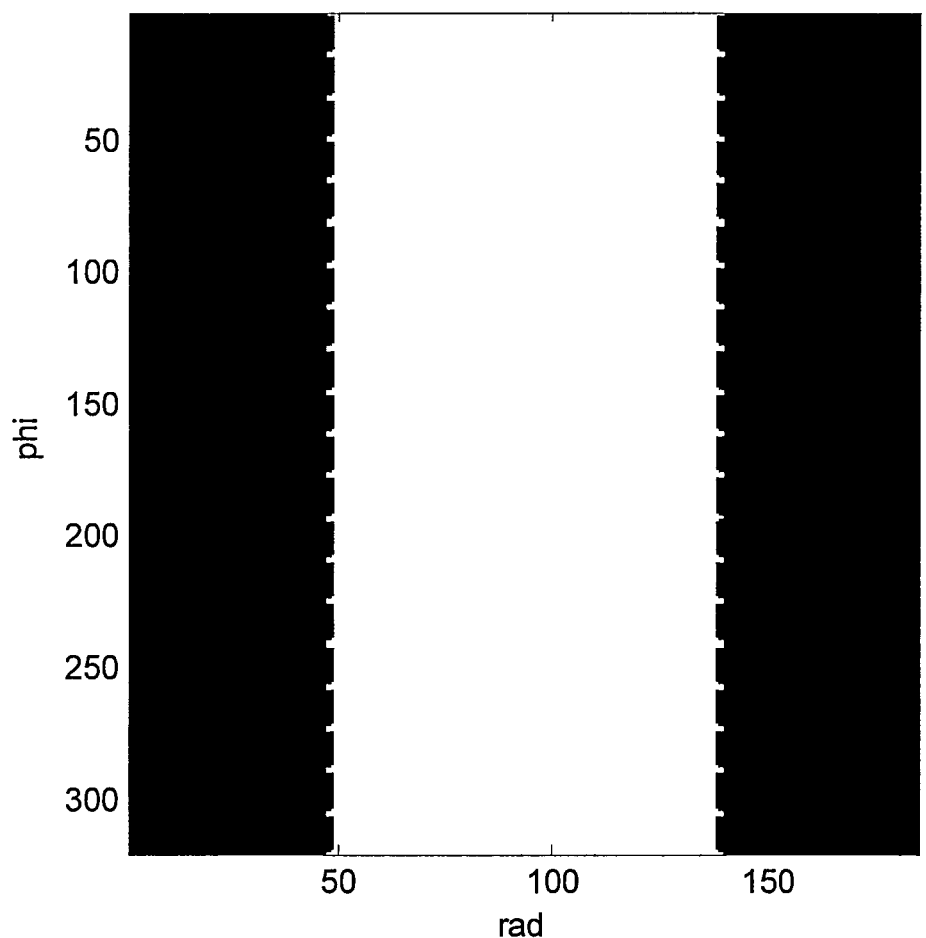
FIGS. 4A, 4B and 4C illustrate the result for the examples of three phantoms after the application of thresholding and morphology operations.
Figure 4B:
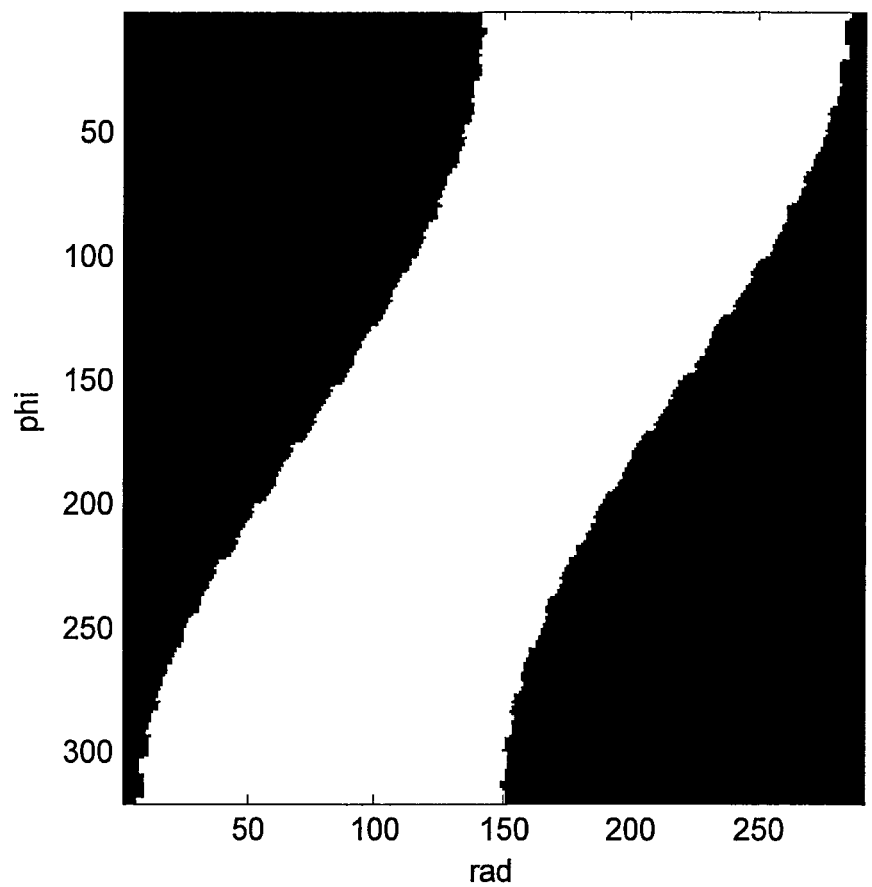
Figure 4C:
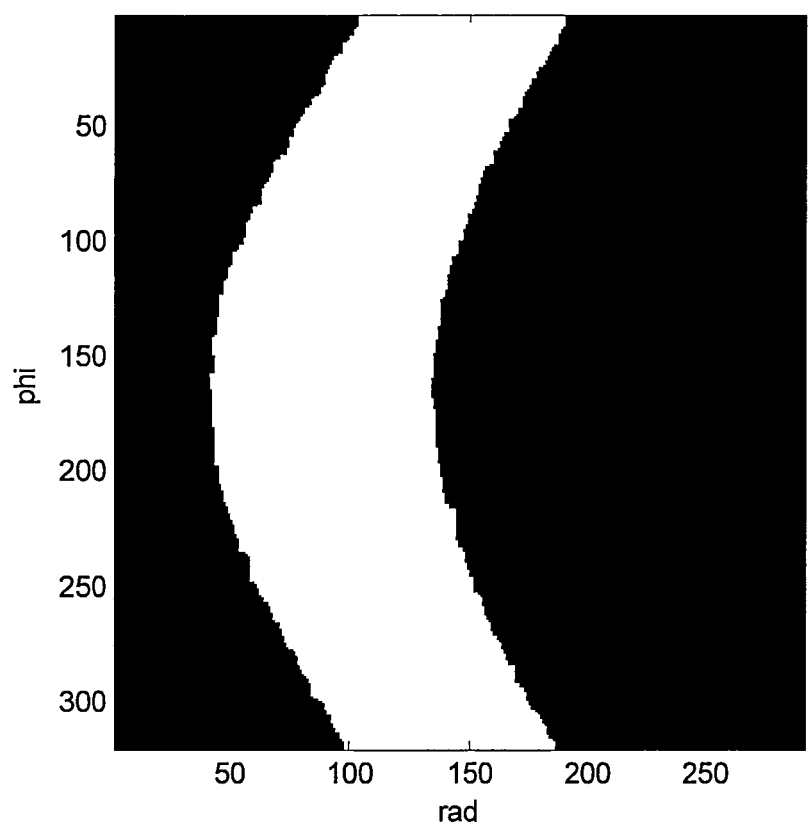

FIGS. 4A-C illustrate a single slice of a sinogram of the first, second and third phantoms, respectively, after the thresholding in step S101 and the morphology operations in step S102 are performed.

Figure 5A:
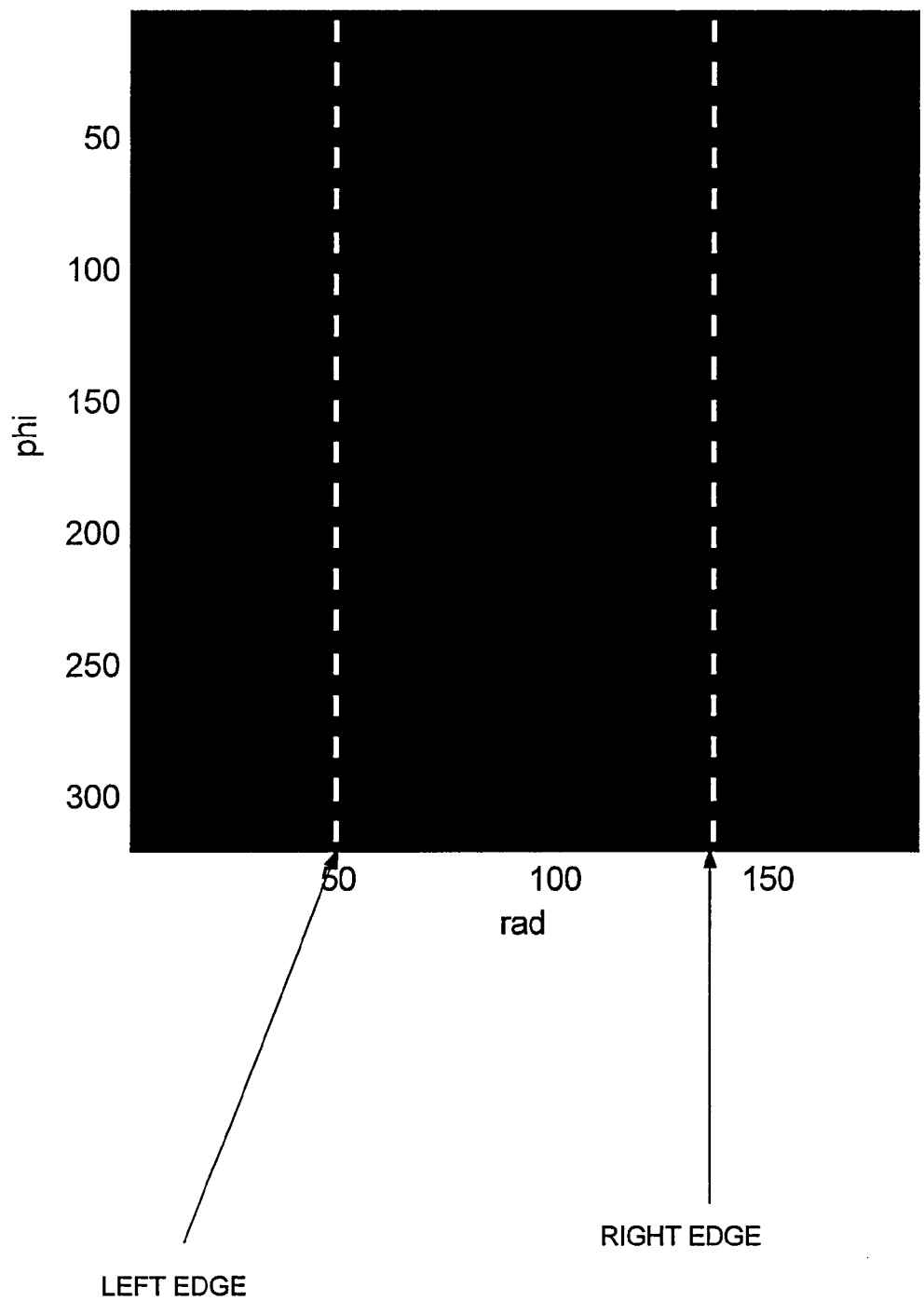
Figure 5C:
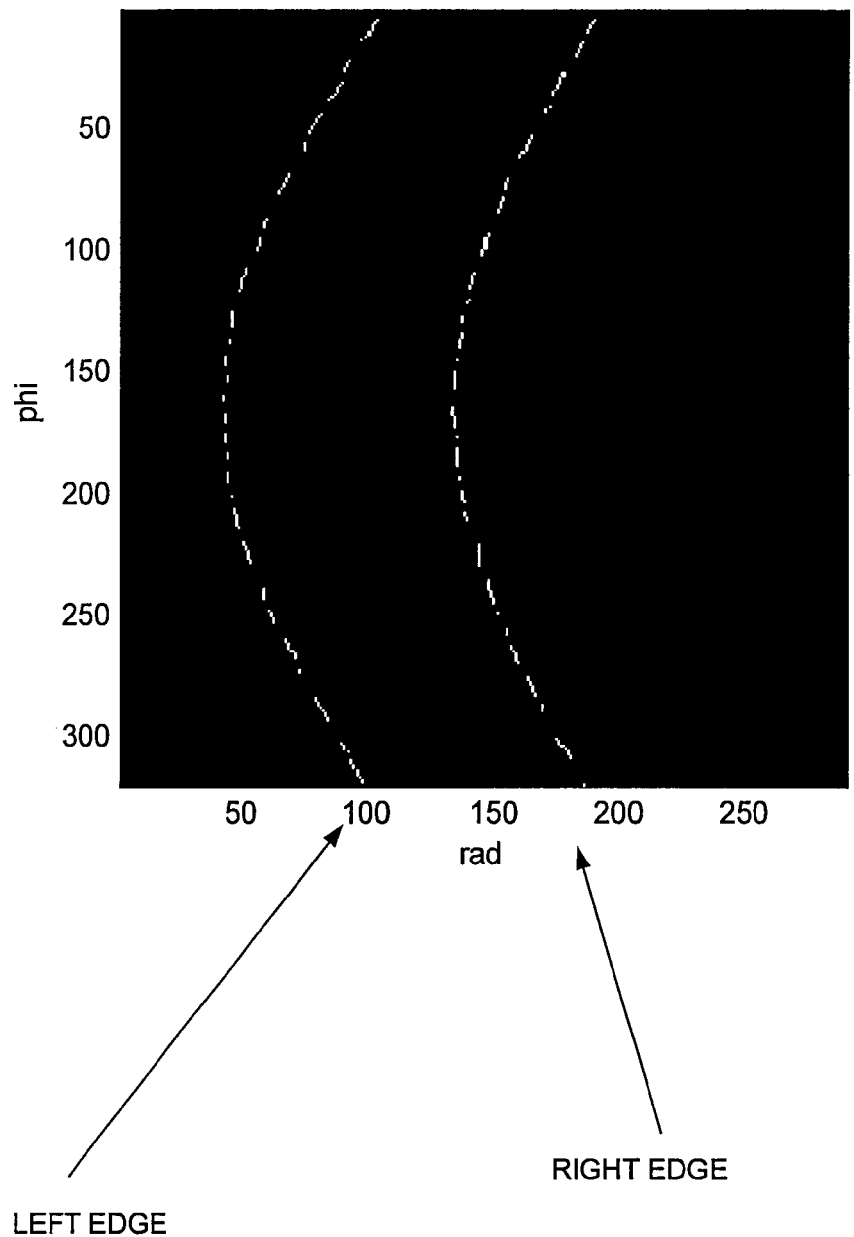

FIGS. 5A-C illustrate the result of the edge detection performed in step S103. The edge detection is performed for each of the first, second, and third phantoms. This edge detection takes place for each single-slice sinogram that has been subject to the normative correction, thresholding, and morphology operations.

As shown in FIGS. 5A-C for the first, second, and third phantoms, respectively, both left and right edges are detected.

Figure 6:
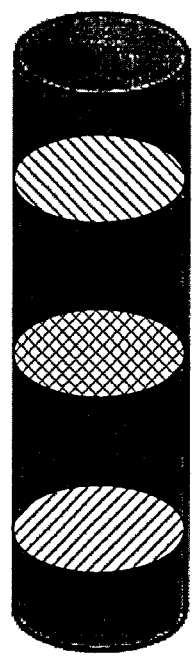
FIG. 6 illustrates an example of one cylinder phantom with three slices being highlighted.

FIG. 6 illustrates an example of one cylinder phantom. In this example, the three slices (#1, #2 and #3) included in table 1 are illustrated.

Figure 7:
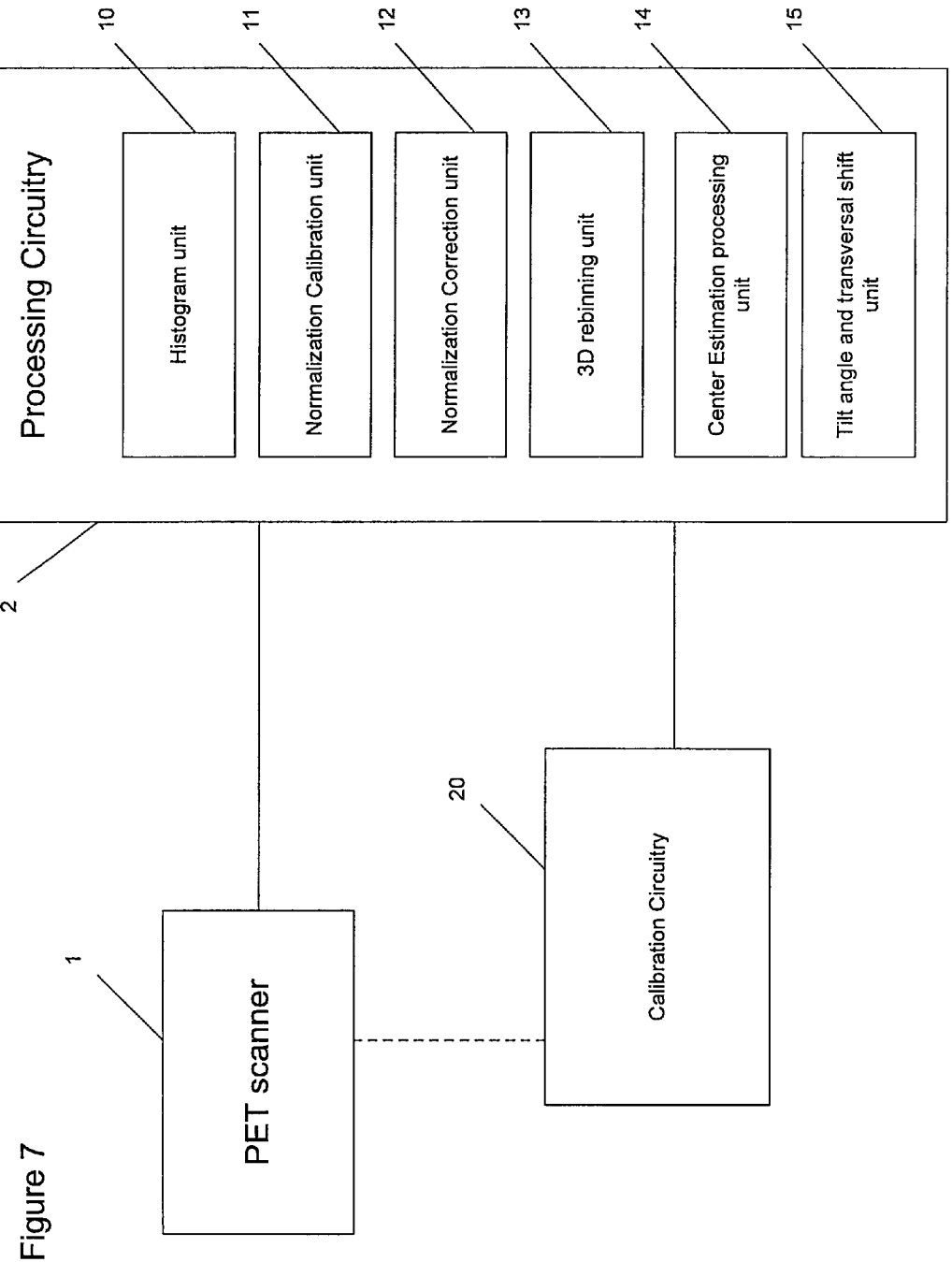
FIG. 7 illustrates an exemplary system for implementing a process for determining the positioning of a cylinder source.
Figure 8:
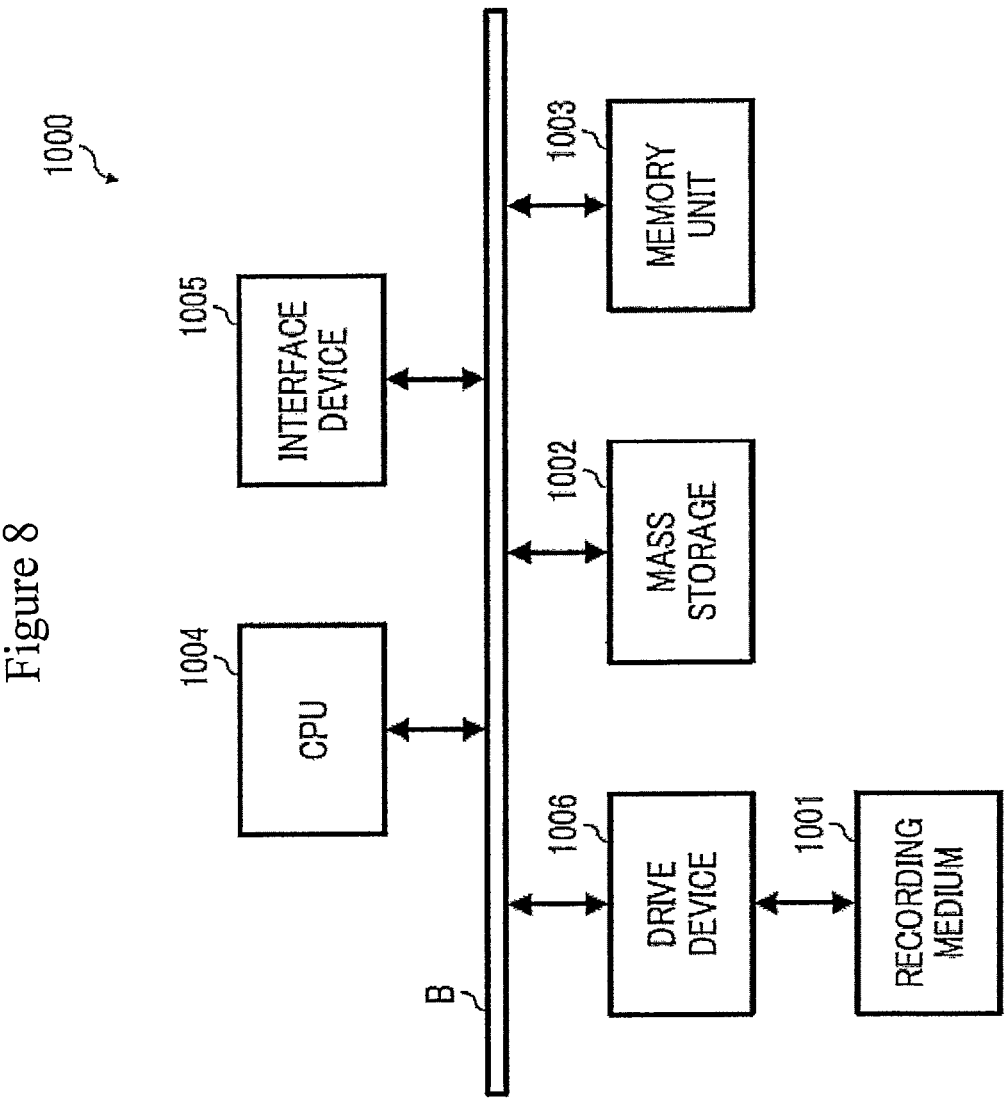
FIG. 8 illustrates a block diagram illustrating a computing device according to one embodiment.

FIG. 7 illustrates an exemplary system for implementing the processes described above with reference to FIGS. 1 and 2.

In the system of FIG. 7, the PET scanner 1 produces the PET prompt list-mode data 101 and the PET delayed list-mode data 103, which are generated by the PET scanner 1.

The data 101 and 103 are transmitted to the processing circuitry 2, which implements the cylinder source position generation.

Specifically, the histogram unit 10 implements the histogramming of the PET prompt paired list-mode data 101 in step S10 described above.

The normalization calibration unit 11 implements the normalization calibration process performed using PET delayed list-mode data 103 in step S12 described above. The normalization calibration unit 11 generates the crystal efficiency correction factors 104.

The normalization correction unit 12 implements the normalization correction process performed using the crystal efficiency normalization correction factors 104 and the PET prompt sinogram 102. The normalization correction unit 12 generates the crystal efficiency corrected prompt sinogram or histogram 105.

The 3D rebinning unit 13 implements the 3D rebinning method that converts the sinogram 105, which is three-dimensional, into stacks of 2D sinograms 106. The stacks of 2D sinograms 106 are a plurality of slices of the sinogram 105 and are illustrated in FIG. 6. The 3D rebinning unit 13 implements the 3D rebinning using a rebinning method such as single slice rebinning (SSRB) or a Fourier rebinning algorithm.

The center estimation processing unit 14 implements the process of step S18 illustrated in detail in FIG. 2. Specifically, the center estimation processing unit 14 determines the axial center (x,y) for each slice z of the 2D sinograms 106.

The tilt angle and the transversal shift unit 15 determines the tilt angle and the transversal shift for each slice z of the 2D sinograms 106 based on the axial center (x,y) determined by the center estimation processing unit 14.

The information determined by the tilt angle and the transversal shift unit 15 and the axial center (x,y) for each slice z is transmitted to the calibration circuitry 20, which uses this information to calibrate the PET scanner 1.

The present embodiments have significant advantages. For example, the present technique can be applied with minimal additional cost. Further the process is able to provide a fast, robust, and accurate estimation. Each of the count-rate adaptive delayed window crystal efficiency normalization, the mean edge from sinogram, which is used for center estimation, and the outlier exclusion criterion, which is applied by using the module-based PET scanner design, provide significant advantages over available systems.

In addition, the present embodiments are able to be applied to ellipse (non-circular) shapes, when or if the axis of the cylinder becomes misaligned with the z-axis of scanner.

Furthermore, axial span, or average over z-direction, can be used for measure (x,y) at different slices. As a result, the central axis of the cylinder can be decided for a rigid phantom, with the estimated centers at several z positions.

At least certain portions or all of the processing described above, for example, the histogram unit, the normalization calibration unit, the normalization correction unit, the 3D rebinning unit, center estimating processing unit, and the tilt angle and the transversal shift unit, which implement the processes or algorithms described above can be implemented or aided by using some form of computer having one or more microprocessor or by using processing circuitry or specialized/dedicated circuitry or circuits. As one of ordinary skill in the art would recognize, the computer processor can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog or any other hardware description language and the code may be stored in an electronic memory directly within the FPGA or CPLD, or as a separate electronic memory. Further, the electronic memory may be non-volatile, such as ROM, EPROM, EEPROM or FLASH memory. The electronic memory may also be volatile, such as static or dynamic RAM, and a processor, such as a microcontroller or microprocessor, may be provided to manage the electronic memory as well as the interaction between the FPGA or CPLD and the electronic memory.

Alternatively, the computer processor may execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OSX and other operating systems known to those skilled in the art.

In addition, certain features of the embodiments can be implemented using a computer based system (FIG. 15). The computer 1000 includes a bus B or other communication mechanism for communicating information, and a processor/CPU 1004 coupled with the bus B for processing the information. The computer 1000 also includes a main memory/memory unit 1003, such as a random access memory (RAM) or other dynamic storage device (e.g., dynamic RAM (DRAM), static RAM (SRAM), and synchronous DRAM (SDRAM)), coupled to the bus B for storing information and instructions to be executed by processor/CPU 1004. In addition, the memory unit 1003 may be used for storing temporary variables or other intermediate information during the execution of instructions by the CPU 1004. The computer 1000 may also further include a read only memory (ROM) or other static storage device (e.g., programmable ROM (PROM), erasable PROM (EPROM), and electrically erasable PROM (EEPROM)) coupled to the bus B for storing static information and instructions for the CPU 1004.

The computer 1000 may also include a disk controller coupled to the bus B to control one or more storage devices for storing information and instructions, such as mass storage 1002, and drive device 1006 (e.g., floppy disk drive, read-only compact disc drive, read/write compact disc drive, compact disc jukebox, tape drive, and removable magneto-optical drive). The storage devices may be added to the computer 1000 using an appropriate device interface (e.g., small computer system interface (SCSI), integrated device electronics (IDE), enhanced-IDE (E-IDE), direct memory access (DMA), or ultra-DMA).

The computer 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer 1000 may also include a display controller coupled to the bus B to control a display, such as a cathode ray tube (CRT), for displaying information to a computer user. The computer system includes input devices, such as a keyboard and a pointing device, for interacting with a computer user and providing information to the processor. The pointing device, for example, may be a mouse, a trackball, or a pointing stick for communicating direction information and command selections to the processor and for controlling cursor movement on the display. In addition, a printer may provide printed listings of data stored and/or generated by the computer system.

The computer 1000 performs at least a portion of the processing steps of the invention in response to the CPU 1004 executing one or more sequences of one or more instructions contained in a memory, such as the memory unit 1003. Such instructions may be read into the memory unit from another computer readable medium, such as the mass storage 1002 or a removable media 1001. One or more processors in a multi-processing arrangement may also be employed to execute the sequences of instructions contained in memory unit 1003. In alternative embodiments, hard-wired circuitry may be used in place of or in combination with software instructions. Thus, embodiments are not limited to any specific combination of hardware circuitry and software.

As stated above, the computer 1000 includes at least one computer readable medium 1001 or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other medium from which a computer can read.

Stored on any one or on a combination of computer readable media, the present invention includes software for controlling the main processing unit 1004, for driving a device or devices for implementing the invention, and for enabling the main processing unit 1004 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code elements on the medium of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the CPU 1004 for execution. A computer readable medium may take many forms, including but not limited to, non-volatile media, and volatile media. Non-volatile media includes, for example, optical, magnetic disks, and magneto-optical disks, such as the mass storage 1002 or the removable media 1001. Volatile media includes dynamic memory, such as the memory unit 1003.

Various forms of computer readable media may be involved in carrying out one or more sequences of one or more instructions to the CPU 1004 for execution. For example, the instructions may initially be carried on a magnetic disk of a remote computer. An input coupled to the bus B can receive the data and place the data on the bus B. The bus B carries the data to the memory unit 1003, from which the CPU 1004 retrieves and executes the instructions. The instructions received by the memory unit 1003 may optionally be stored on mass storage 1002 either before or after execution by the CPU 1004.

The computer 1000 also includes a communication interface 1005 coupled to the bus B. The communication interface 1004 provides a two-way data communication coupling to a network that is connected to, for example, a local area network (LAN), or to another communications network such as the Internet. For example, the communication interface 1005 may be a network interface card to attach to any packet switched LAN. As another example, the communication interface 1005 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1005 sends and receives electrical, electromagnetic or optical signals that carry digital data streams representing various types of information.

The network typically provides data communication through one or more networks to other data devices. For example, the network may provide a connection to another computer through a local network (e.g., a LAN) or through equipment operated by a service provider, which provides communication services through a communications network. The local network and the communications network use, for example, electrical, electromagnetic, or optical signals that carry digital data streams, and the associated physical layer (e.g., CAT 5 cable, coaxial cable, optical fiber, etc). Moreover, the network may provide a connection to a mobile device such as a personal digital assistant (PDA) laptop computer, or cellular telephone.

In the above description, any processes, descriptions or blocks in flowcharts should be understood as representing modules, segments or portions of code which include one or more executable instructions for implementing specific logical functions or steps in the process, and alternate implementations are included within the scope of the exemplary embodiments of the present advancements in which functions may be executed out of order from that shown or discussed, including substantially concurrently or in reverse order, depending upon the functionality involved, as would be understood by those skilled in the art.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

The invention claimed is:

1. A method for determining a position of a source, comprising:
    obtaining prompt data and related delayed data from a Positron Emission Tomography (PET) scanner, the delayed data includes random events;
    generating a sinogram from the prompt data;
    generating crystal efficiency correction factors by performing a normalization calibration based on the obtained delayed data;
    performing normalization correction on the generated sinogram based on the crystal efficiency correction factors to generate a corrected sinogram;
    rebinning the corrected sinogram to generate a plurality of two-dimensional sinogram slices; and determining a central axis for each of the plurality of two-dimensional sinogram slices using a center estimation process, wherein the step of determining the central axis for each of the plurality of two-dimensional sinogram slices further comprises:
performing a thresholding process on each of the plurality of two-dimensional sinogram slices to convert the respective slice to a binary image to generate a plurality of binary images;
performing morphology operations on the respective binary image to generate processed binary images;
detecting left and right edges in the respective processed binary images;
excluding edge outliers, within the plurality of processed binary images, that correspond to crystals at transversal edges of each module;
determining a mean curve of the left and right edges; and
applying sinusoidal function curve fitting to the mean curve of the left and right edges in order to determine the central axis within the sinogram.

2. The method according to claim 1, further comprising:
deriving an axial tilt angle and a transversal shift for each of the plurality of two-dimensional sinogram slices based on the respective determined central axis.

3. The method according to claim 1, wherein the source is a cylinder.

4. The method according to claim 1, wherein the source is an ellipse.

5. The method according to claim 1, wherein the thresholding processing is one of
a histogram-shape-based process in which characteristic elements of a smoothed histogram are used to obtain a binary image,
a clustering-based process in which gray-level samples are clustered in background and foreground regions or are modeled as a mixture of Gaussians,
an entropy process, which implements algorithms that use entropy of foreground and background regions or use cross-entropy between an original and a binarized image,
an object-attribute-based process, which searches for similarities between gray-level and binarized images, where the similarities include fuzzy shape similarity and edge coincidence,
a spatial process, which utilizes a higher-order probability distribution taking into account a correlation between pixels, and
a local process, which applies a threshold value to each pixel based on local image characteristics.

6. The method according to claim 1, wherein the thresholding processing is a histogram-shape-based process, and wherein the histogram-shape-based process includes generating a histogram having two peaks representing background and object regions. and determining a minimum between the two peaks.

7. The method according to claim 1, wherein the morphology operations include at least one of dilation and erosion.

8. The method according to claim 1, wherein the excluding step further includes excluding lines of response with crystals at transversal edges of each module, from the detected edges.

9. An apparatus for determining a position of a source, comprising:

processing circuitry configured to:
obtain prompt data and related delayed data from a Positron Emission Tomography (PET) scanner, the delayed data includes random events,
generate a sinogram from the prompt data, the generating utilizing histogram analysis,
generate crystal efficiency correction factors by performing a normalization calibration based on the obtained delayed data,
perform normalization correction on the generated sinogram based on the crystal efficiency correction factors to generate a corrected sinogram,
rebin the corrected sinogram to generate a plurality of two-dimensional sinogram slices, and
determine a central axis for each of the plurality of two-dimensional sinogram slices using a center estimation process,
wherein the processing circuitry is further configured to determine the central axis for each of the plurality of two-dimensional sinogram slices further comprises by being configured to
perform a thresholding process on each of the plurality of two-dimensional sinogram slices to convert the respective slice to a binary image to generate a plurality of binary images;
perform morphology operations on the respective binary image to generate processed binary images;
detect left and right edges in the respective processed binary images;
exclude edge outliers, within the plurality of processed binary images, that correspond to crystals at transversal edges of each module;
determine a mean curve of the left and right edges; and
apply sinusoidal function curve fitting to the mean curve of the left and right edges in order to determine the central axis within the sinogram.

10. The apparatus according to claim 9, wherein the processing circuitry is further configured to derive an axial tilt angle and a transversal shift for each of the plurality of two-dimensional sinogram slices based on the respective determined central axis.

11. The apparatus according to claim 9, wherein the source is a cylinder.

12. The apparatus according to claim 9, wherein the source is an ellipse.

13. The apparatus according to claim 9, wherein the thresholding processing is one of
a histogram-shape-based process in which characteristic elements of a smoothed histogram are used to obtain a binary image,
a clustering-based process in which gray-level samples are clustered in background and foreground regions or are modeled as a mixture of Gaussians,
an entropy process, which implements algorithms that use entropy of foreground and background regions or use cross-entropy between an original and a binarized image,
an object-attribute-based process, which searches for similarities between gray-level and binarized images, where the similarities include fuzzy shape similarity and edge coincidence,
a spatial process, which utilizes a higher-order probability distribution taking into account a correlation between pixels, and
a local process, which applies a threshold value to each pixel based on local image characteristics.

14. The apparatus according to claim 9, wherein the thresholding processing is a histogram-shape-based process, and wherein the histogram-shape-based process includes generating a histogram having two peaks representing background and object regions, and determining a minimum between the two peaks.

15. The apparatus according to claim 9, wherein the morphology operations include at least one of dilation and erosion.

16. The apparatus according to claim 9, wherein the processing circuitry is further configured to exclude edge outliers by being configured to exclude lines of response with crystals at transversal edges of each module, from the detected edges.

17. A non-transitory computer readable medium having stored thereon a program that when executed by a computer causes the computer to execute a method for determining a position of a source, comprising:

obtaining prompt data and related delayed data from a Positron Emission Tomography (PET) scanner, the delayed data includes random events;

generating a sinogram from the prompt data;

generating crystal efficiency correction factors by performing a normalization calibration based on the obtained delayed data;

performing normalization correction on the generated sinogram based on the crystal efficiency correction factors to generate a corrected sinogram;

rebinning the corrected sinogram to generate a plurality of two-dimensional sinogram slices; and determining a central axis for each of the plurality of two-dimensional sinogram slices using a center estimation process, wherein the step of determining the central axis for each of the plurality of two-dimensional sinogram slices further comprises:

performing a thresholding process on each of the plurality of two-dimensional sinogram slices to convert the respective slice to a binary image to generate a plurality of binary images;

performing morphology operations on the respective binary image to generate processed binary images;

detecting left and right edges in the respective processed binary images;

excluding edge outliers, within the plurality of processed binary images, that correspond to crystals at transversal edges of each module;

determining a mean curve of the left and right edges; and applying sinusoidal function curve fitting to the mean curve of the left and right edges in order to determine the central axis within the sinogram.

* * * * *